United States Patent
Tran

(10) Patent No.: US 6,898,619 B1
(45) Date of Patent: May 24, 2005

(54) SYSTEM AND METHOD FOR DYNAMICALLY DISABLING RESUBMISSION OF HTTP REQUESTS

(75) Inventor: Tuan Tran, Milpitas, CA (US)

(73) Assignee: Sun Microsystmes, Inc., Palo Alto, CA (US)

( * ) Notice: Subject to any disclaimer, the term of this patent is extended or adjusted under 35 U.S.C. 154(b) by 743 days.

(21) Appl. No.: 09/731,782

(22) Filed: Dec. 8, 2000

(51) Int. Cl.$^7$ .......................... G06F 15/16; G06F 17/60
(52) U.S. Cl. ...................... 709/203; 709/224; 709/229; 705/26
(58) Field of Search ............................... 709/203, 224, 709/229; 705/26

(56) References Cited

U.S. PATENT DOCUMENTS 6,237,035 B1 * 5/2001 Himmel et al. ............. 709/224
6,535,883 B1 * 3/2003 Lee et al. ................... 707/100

\* cited by examiner

Primary Examiner—Hosain Alam
Assistant Examiner—David Lazaro
(74) Attorney, Agent, or Firm—William J. Kubida; Kent A. Lembke; Hogan & Hartson LLP

(57) ABSTRACT

A system for dynamically disabling the resubmission of HTTP requests. In one embodiment, the present invention is a method for selectively disabling resubmission of an HTTP request that includes the steps of receiving input relating to a functional group of input controls, wherein a functional group is a set of input controls (e.g., buttons, radio boxes, hyperlinks), determining whether a member of the functional group has been previously activated, and, if a member of the functional group has been previously activated, selectively disabling the resubmission of the HTTP request. In one embodiment, selectively disabling the resubmission of the HTTP request means that when a confirmation attribute value is determined to have a first value, a first message is displayed indicating that a related response has been previously submitted and including a control to enable the resubmission of the HTTP request. When the confirmation attribute has a second value, a second message is displayed indicating that a related response has been previously submitted and including no control to enable the resubmission of the HTTP request.

16 Claims, 3 Drawing Sheets

SYSTEM AND METHOD FOR DYNAMICALLY DISABLING RESUBMISSION OF HTTP REQUESTS

BACKGROUND OF THE INVENTION

1. Field of the Invention

The present invention relates to a system and method for dynamically disabling the resubmission of HyperText Transfer Protocol (HTTP) requests. More specifically, the present invention relates to a system and method for dynamically disabling the resubmission of HTTP requests using a client-side script.

2. Description of Related Art

For many web sites, resubmitting an HTTP request may not be desirable. For example, if an HTTP request relating to a particular e-commerce web page is submitted twice, it may not be clear whether the user intended to transmit a second a request (e.g., order two items), modify a first request (e.g., request a second product instead of the first product), or ensure that the first request was received (e.g., only one product desired).

Conventional systems and methods exist for preventing a resubmission of an HTTP request. A control, such as the back button, may be concealed in order to prevent a user from returning to a particular web page. However, this technique may be overcome by manipulating by right-clicking within a web-browser window and selecting the "Back" command.

Additionally, some systems may attempt to prevent resubmissions by forcing the expiration of a particular web page by using a "Pragma: No-Cache" tag. A "Pragma: No-Cache" tag is designed to prevent a browser from maintaining a copy of the document in cache. However, it may be desirable to enable a user to return to particular page. For example, the user may want to manipulate a control that is unrelated to the request (e.g., a link to an advertiser's home page or another control that is unrelated to the submitted transaction) or review the page from which the HTTP request was generated (e.g., determine a price or shipment date for a transaction). Additionally, some browsers do not properly support the "Pragma: No-Cache" functionality under certain conditions (e.g., Internet Explorer fails to implement the functionality properly when a requested document is greater than 64 KB).

Similarly, some systems may attempt to prevent HTTP request resubmissions by programmatically determining that a particular page has been previously submitted by using a unique key with each page. This technique, however, requires a request of and response from the server, thereby placing a heavier burden on the server and increasing the wait-time for the client.

SUMMARY OF THE INVENTION

Accordingly, the present invention is directed to a system and method for dynamically disabling the resubmission of HTTP requests that substantially obviates one or more of the problems due to limitations and disadvantages of the related art.

An object of the present invention is to provide a system and method for dynamically disabling the resubmission of HTTP requests using a client-side script. By preventing a user from activating controls relating to a previously submitted HTTP request while enabling the user to activate other controls not relating to the previously submitted HTTP request, the present invention may increase performance for a user while decreasing the burden on an associated server.

In one embodiment, the invention comprises receiving input relating to a functional group, wherein a functional group comprises at least two input controls, determining whether a member of the functional group has been previously activated, and, when a member of the functional group has been previously activated, selectively disabling the resubmission of the HTTP request.

In another embodiment, the invention is a network device comprising a network communication interface configured to receive a web page comprising a plurality of input controls from a network, wherein at least two of the plurality of input controls are group members of a functional group, an input device configured to receive user input relating to resubmission of the HTTP request, and a processor configured to selectively disable resubmission of the HTTP request when a functional group member has been previously submitted.

In another embodiment, the invention comprises a network communication interface configured to receive a web page comprising a plurality of input controls from a network, wherein at least two of the plurality of input controls are group members of a functional group input device means configured to receive user input relating to resubmission of the HTTP request, and processor means configured to selectively disable resubmission of the HTTP request when a functional group member has been previously submitted.

In yet another embodiment, the present invention comprises a computer readable medium having computer code embodied therein for selectively disabling resubmission of an HTTP request comprising computer readable program code devices configured as a network communication interface configured to receive a web page comprising a plurality of input controls from a network, wherein at least two of the plurality of input controls are group members of a functional group, computer readable program code devices configured to receive user input relating to resubmission of the HTTP request, and computer readable program code devices configured to selectively disable resubmission of the HTTP request when a functional group member has been previously submitted.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
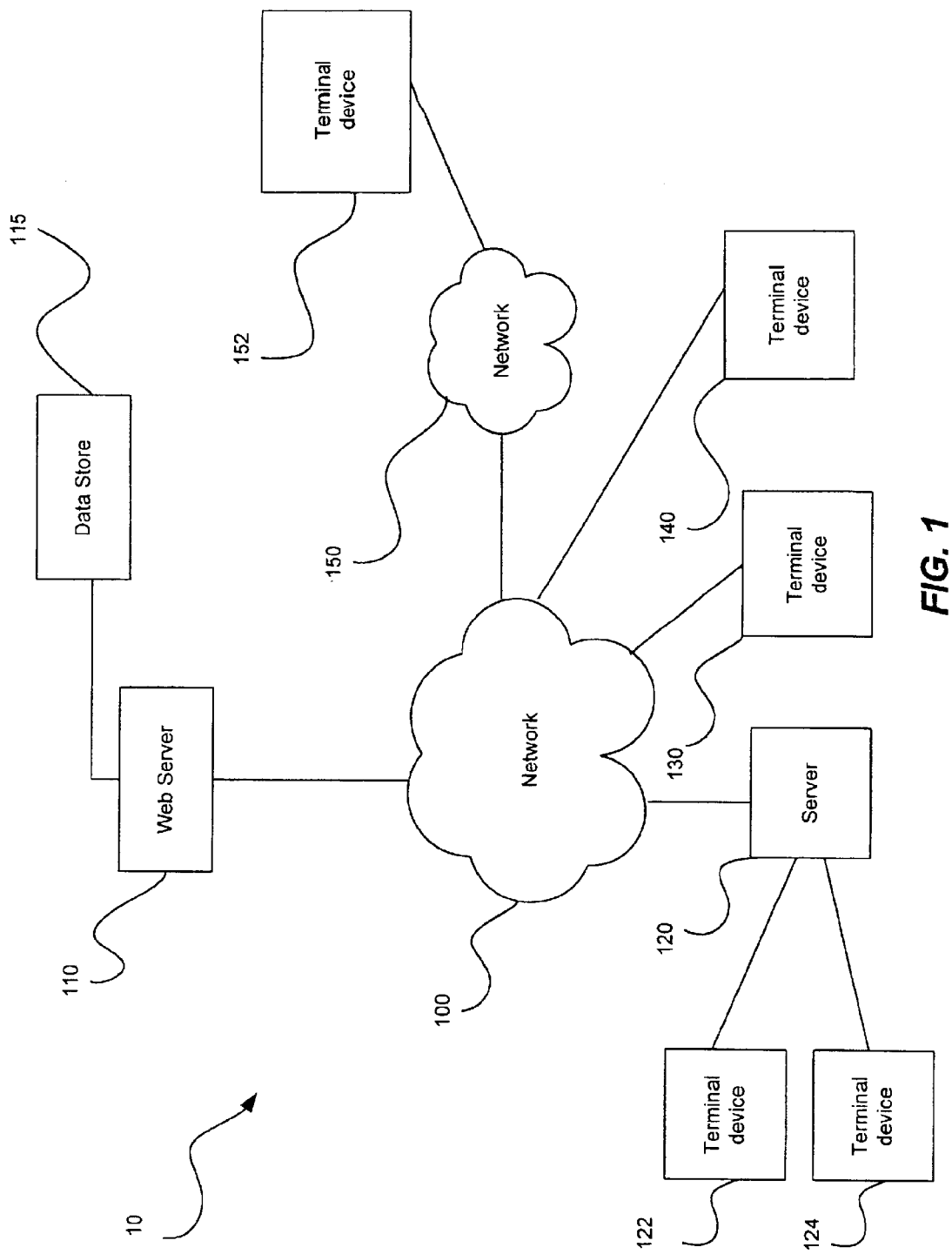
FIG. 1 shows a block diagram of an embodiment of the present invention.

Reference will now be made in detail to the preferred embodiment of the present invention, examples of which are illustrated in the drawings.

FIG. 1 shows a block diagram of an embodiment of the present invention. By way of overview, system 10 comprises a web server 110 configured to communicate with data store 115 and a plurality of network devices 122, 124, 130, 140, 152. Data store may comprise relational data from a relational database management system as well as non-relational data from sources such as Lightweight Directory Access protocol or Internet Message Access Protocol servers. In one embodiment, network devices 122, 124, 130, 140, 152 communicate with web server 110 via networks 100, 150. Networks 100, 150 may comprise any type of network, such as a local area network, wide area network, virtual private network, a wireless network, and/or the Internet.

Figure 2:
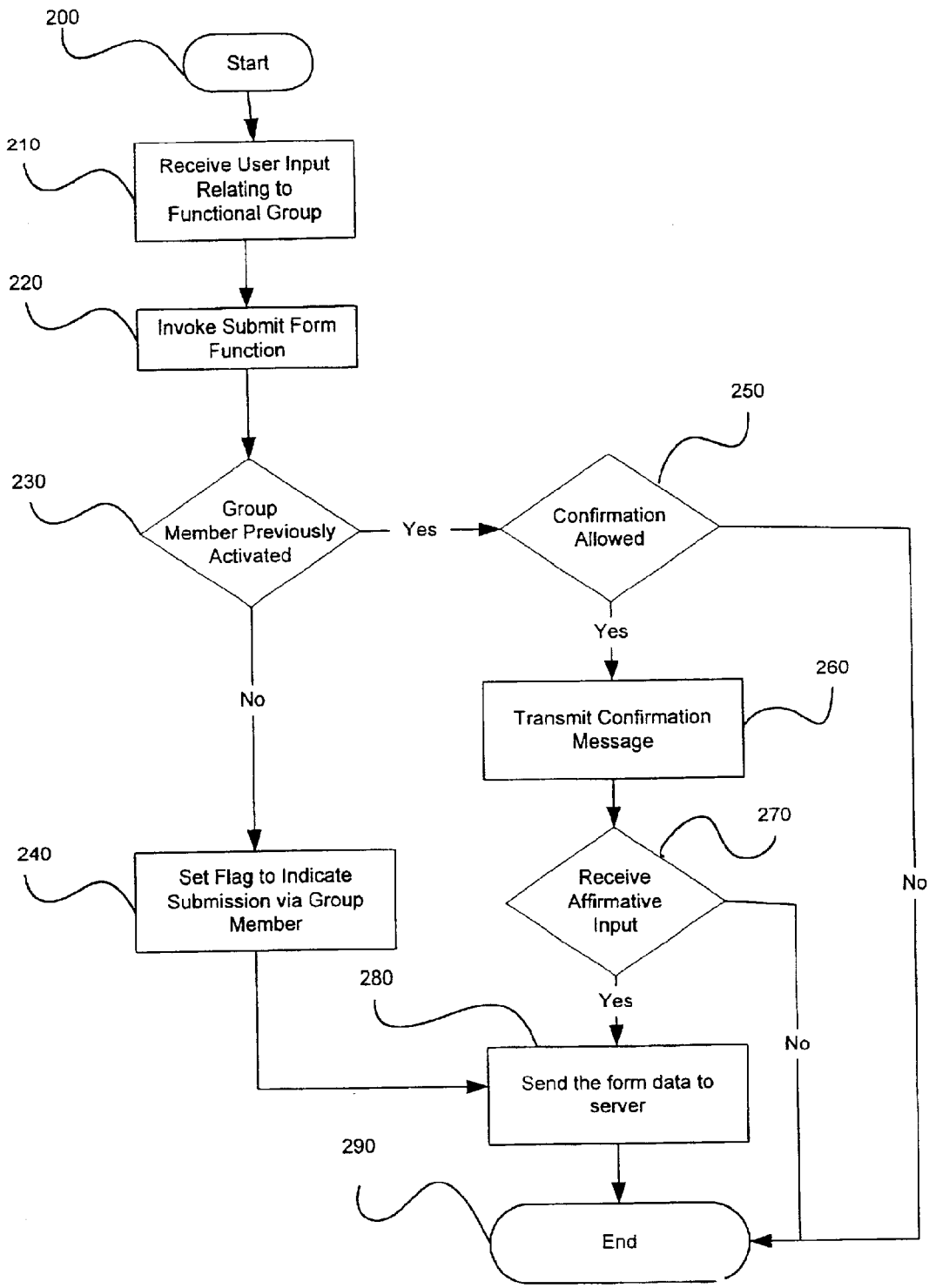
FIG. 2 shows a logic diagram in accordance with the present invention.

FIG. 2 shows a logic diagram in accordance with the present invention. At step 200, the system is initiated. At step 210, the system receives user input relating to a functional group. At step 220, the system invokes a submit form function. At step 230, the system determines whether group members have been previously activated. If a group member has not been previously submitted, the system proceeds to step 240 and 280, thereby submitting the form data and setting a flag to indicate that a submission has occurred via a group member. If the system determines that a group member has been previously submitted, the system proceeds to step 250 and determines whether confirmation has been allowed. If the system determines that confirmation is not allowed, the system proceeds to step 290. If the system determines that confirmation is allowed, the system proceeds to step 260. At step 260, the system renders a confirmation message. At step 270, the system determines whether input received in response to the confirmation message is affirmative. If the information is negative, the system proceeds to step 290 and the function terminates. If the information is affirmative, the system proceeds to step 280 and sends the form data to the server. After sending the form data to the server, the system terminates at step 290. Each of these acts is described in greater detail below.

At step 210, the system receives user input relating to a functional group. In one embodiment, a functional group comprises a plurality of user input controls. For example, members of a functional group may be a submit button and a cancel button in a web page. The members of a functional group may be identified by a unique key that is generated by a server responsible for serving web pages. Additionally, a developer may assign a unique key to a functional group at design time. In a preferred embodiment, the following Hyper Text Markup Language (HTML) may be used to implement the present invention:

<A HREF="Javascript:submitForm(submitAction, 'KEY-ABC', false)">Submit</a>
    <A HREF="Javascript:submitForm(submitAction, 'KEY-ABC', false)">Cancel</a>

In the above example, the unique key is the ABC identifier, which identifies the submit and cancel button as being members of the same functional group. Other input controls having different unique keys (including no unique key) may form other functional groups. Additional techniques of establishing functional groups may also be used. In one embodiment, a functional group comprises at least two input controls, however it is possible to implement the present invention by designating a single input control as a functional group.

At step 220, the system invokes a submit form function. In one embodiment, the code depicted in the example of source code listing disclosed below may be used to implement the functionality disclosed herein. At step 230, the system determines whether group members have been previously activated. In one embodiment, this functionality is implemented using a flag that is associated with the unique key. The flag may be saved in a cookie associated with the unique key. This functionality may be implemented as disclosed in the allowSubmit( ) function of the example of source code listing disclosed below. Other methods of determining whether a member of a functional group has been previously submitted are also possible.

If a group member has not been previously submitted, the system proceeds to step 240 and 280. At step 240, the system may set the flag associated with a functional group to indicate that a submission via a group member has occurred. At step 280, the system may send the form data to the server.

If, at step 230, the system determines that a group member has been previously submitted, the system proceeds to step 250 and determines whether confirmation has been allowed. Step 250 is the step at which the system selectively disables the resubmission of the HTTP request. Specifically, when confirmation is allowed a user may allow the resubmission of an HTTP request based on the activation of a member of the functional group, despite the fact that an HTTP request has previously been submitted based on the activation of a member of the functional group. However, if confirmation is not allowed, then the user is not given the option to resubmit an HTTP request. In one embodiment, the system determines whether confirmation is allowed by evaluating an attribute associated with the input control. For example, an input control may include a true or false value after the unique key, as depicted below:

<A HREF="Javascript:submitForm(submitAction, 'KEY-ABC', false)">Submit</a>
    <A HREF="Javascript:submitForm(submitAction, 'KEY-ABC', false)">Cancel</a>

If the confirmation attribute is true, activation is allowed and the system may proceed to step 260. If the confirmation attribute is false, the system may proceed to step 290, in which case the form data is not resubmitted. In one embodiment, the system may present an alert message indicating that a related response has been previously submitted and having no control enabling the HTTP request from being resubmitted (e.g., once the user selects OK, no HTTP request is sent to the server). In the embodiment disclosed in the example of source code listing disclosed below, whether the system proceeds to step 260 or 290 is based on the value of a confirmFlag variable, which is based on the confirmation attribute.

If the system determines that confirmation is allowed, the system proceeds to step 260. At step 260, the system renders a confirmation message including a control to enable the resubmission of the HTTP request. For example, the system may render a confirm message saying "This form has been previously submitted. Submitting again may result in an error. Do you want to submit?" as depicted in the allowSubmit( ) function in the example of source code listing disclosed below.

At step 270, the system determines whether input received in response to the confirmation message is affirmative. If the input value is affirmative (e.g., the user selects "OK"), the system may proceed to step 280 and resubmit the HTTP request. If the input is negative (e.g., the user selects "Cancel"), the system may disable the resubmission of the HTTP request. At step 290, the function terminates.

Figure 3:
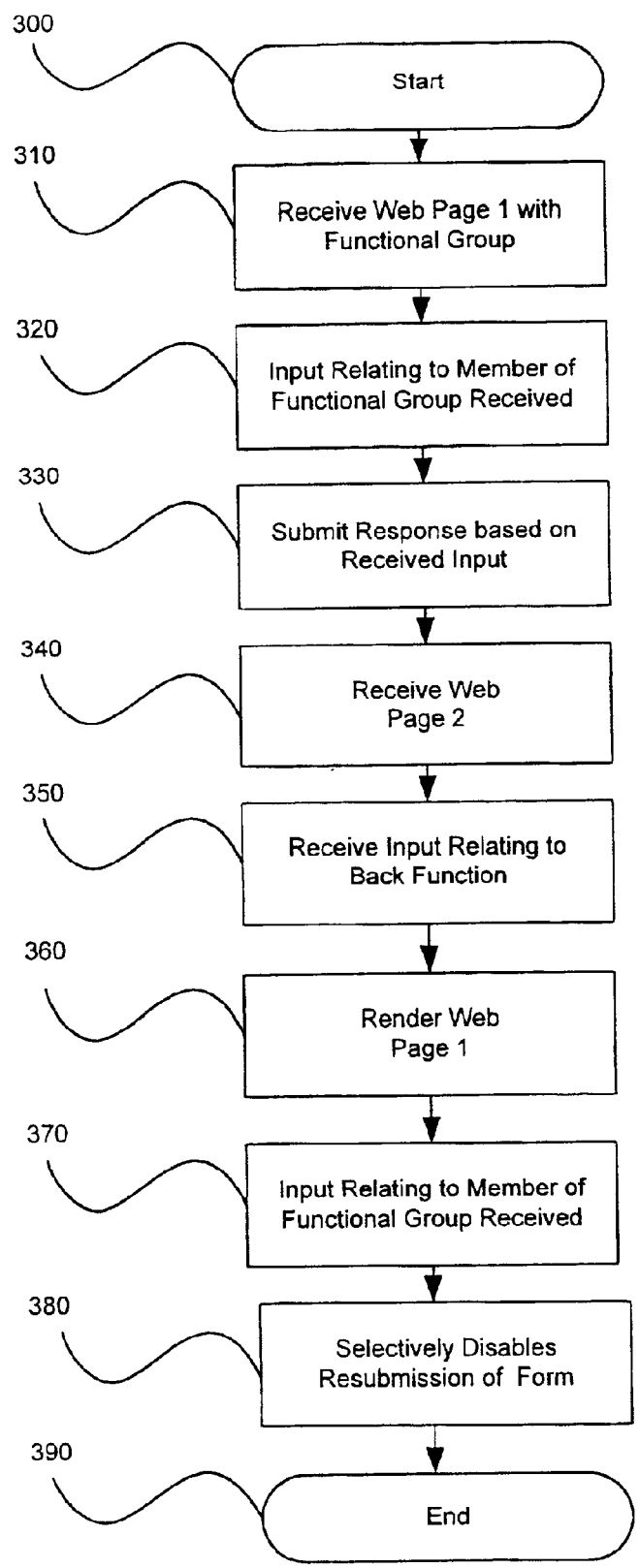
FIG. 3 shows an exemplary implementation of the present invention.

FIG. 3 shows an exemplary implementation of the present invention. This invention may be implemented on a conventional network device, such as a personal computer. In a preferred embodiment, the network device comprises a network communication interface configured to receive a web page comprising a plurality of input controls from a network, an input device such as a key board mouse and/or touch screen, and a processor configured to selectively disable HTTP request resubmission as described in greater detail below.

By way of overview, at step 300 the function is initiated. At step 310, a first web page is received. At step 320, input relating to a member of the functional group is received. At step 330, a response is submitted based on the received input. At step 340, a second web page is received. At step 350, input relating to a back function is received. At step 360, the first web page is rendered. At step 370, input relating to a member of the functional group is again received. At step 380, the system prevents resubmission of the HTTP request. At step 390, the function is ended. Each of these acts is explained in greater detail below.

At step 310, a first web page is received. For example, the web page may relate to a purchase transaction at an e-commerce site. The web page may include a plurality of controls. A subset of these controls may share a unique key and, therefore, belong to a functional group. For example, a submit and cancel key may both have the unique key of "ABC" and, therefore, be members of the functional group. Additionally, this first web page may include other controls that are not in the functional group. For example, these controls may not be directly related to the transaction (e.g., links to other web sites) or may be related but can be activated after a previous submission (e.g., controls that enable a user to query for information on related products).

At step 320, input relating to a member of the functional group is received. For example, a user may select the "Submit" button. This received input may cause an HTTP response to be submitted at step 330. This response may cause a web server to update a database to reflect a new purchase, for example. At step 340, a second web page may be received in response to the submission of the HTTP request in step 330 (although it is possible to implement the present invention if the system remains on the first page).

At step 350, input relating to a back function is received. For example, a user may select a back button in a browser window, right click in a browser window and select back, or otherwise activate a back function. At step 360, the first web page is again rendered. In one embodiment, rendering the first web page from a cache associated with the network device.

At step 370, input relating to a member of the functional group is again received. For example, a user may attempt to activate either the submit button or the cancel button associated with the "ABC" functional group. At step 380, the system selectively disables resubmission of the HTTP request. Because the confirmation attribute is false for the members of the "ABC" functional group, the user is not given a warning and opportunity to confirm his or her intention to resubmit the HTTP request. Instead, the user is presented with an alert screen that indicates that the HTTP request has been previously submitted with no control that enables the resubmission of the HTTP request.

An example of a source code listing according to an exemplary embodiment of the present invention is given below. The below example is given for illustrative purposes only, and the embodiments of the present invention may be implemented according to other source code listings known to those skilled in the art.

PageHistory methods
Description:
    definition of the PageHistory methods

```
================================================================
======== */
function PageHistory__setPageFlag(name, flag) {
    //variable used in the cookie: literal string with 'to escape the potential:
inside of name
    var namelit = """+ name +""";
    //set it in the cookie string
    //case in it is in pages already, then modify value in cookie
    if (!this.isNotInHistory(name)) {
        var repl = new RegExp(namelit + ":" + "[^\\s]*\\s");
        debug(GeuDebug, "this.cookie before", this.cookie);
        debug(GenDebug, "repl", repl);
        this.cookie = this.cookie.replace(repl, namelit + ":" + flag +" ");
        debug(GenDebug, "this.cookie after", this.cookie);
    }
    else {
        //case cookie empty, create it
        if (this.cookie == "") {
            this.cookie ="{"+ namelit +":" + flag +"}";
        }
        //else add it to the beginning
        else {
            this.cookie ="{"+ namelit +":" + flag +","+
this.cookie.substr(1);
        }
        this.size++;
        debug(GenDebug, "this.size", this.size);
        //case size > maxsize, remove lru = end
        if (this.size > this.maxsize) {
            debug(GenDebug, "this.cookie before size restraint", this.cookie);
            this.cookie = this.cookie.slice(0, this.cookie.lastIndexOf(",")) +
"}";
            debug(GenDebug, "this.cookie after size restraint", this.cookie);
        }
    }
    debug(GenDebug, "this.cookie end", this.cookie);
```

-continued

```
        //set it in the hashtable
        this.pages[name] = flag;
        //set the cookie
        setCookie("pageh", this.cookie);
}
function PageHistory_getPageFlag(name) {
        if (IsDef(this.pages[name])) return this.pages[name];
}
function PageHistory_isNotInHistory(name) {
        if (IsUndef(this.pages[name])) return true;
        return false;
}
/*================================================================
========
```

PageHistory( )

DESCRIPTION definition of the PageHistory constructor

The PageHistory object stores a mru/lru (most and least recently used) list of size maxSize pages for which you submitted a form When you add a page and the list is full we discard lru and add it as mru Pages are characterized by a guid and a a flag The flag indicates if the page has already been submitted This object has some methods that lets you add a page, update a flag for a page and get a flag from a page.

```
=====================================================
======== */
//no need to use prototypes since we use only one instance of the object
function PageHistory(maxsize) {
        //define the member variables
        this.maxsize = maxsize;
        this.size = 0;
        //we store a js expression defining an associative array in the cookie
        //we instantiate the array for quick lookups in the js object pages
        //we keep the cookie to manage the lru/mru for serialization
        //this makes the whole thing much faster: remove beginning and add
to the end are very easy ops on strings
        //and we don't have to loop to serialize/deserialize
        this.cookie = getCookie("pageh");
        debug(GenDebug, "this.cookie", this.cookie);
        if (this.cookie == "") {
                this.pages = new Object( );
        }
        else {
                this.pages = eval("bozo = " + this.cookie);
                this.size = this.cookie.split(',').length;
                debug(GenDebug, "this.size", this.size);
        }
        //define the methods
        this.setPageFlag = PageHistory_setPageFlag;
        this.getPageFlag = PageHistory_getPageFlag;
        this.isNotInHistory = PageHistory_isNotInHistory;
        debug(GenDebug, "pages", dumpObject(this.pages));
}
var pageHistory = new PageHistory(20);
/*=====================================================
========
``` allowSubmit(name)

Description:

checks if a page is allowed to be submitted. If it is allowed to do so, returns true and sets its flag to 0 so that it won't be allowed again.

to be called on a on Submit handler

```
=====================================================
======== */
function allowSubmit(name, confirmFlag) {
        uKey = pageHistory.getPageFlag(name)
                debug(GenDebug, "uKey", uKey);
        if (uKey == "1") {
                        pageHistory.setPageFlag(name, "0");
                        return true;
        } else {
                if (confirmFlag) {
                        return confirm("This form has previously been submitted.
Submitting again may result in an error. Do you want to submit?");
                } else {
                        alert("This Form has previously been submitted. It cannot
be submited again.");
                        return false;
                }
        }
}
/*=====================================================
========
``` putPageInHistory(name)

Description:

puts a page in history if it is not there, with a flag allowing it to be submitted.

To be called at the beginning of your page

```
=====================================================
======== */
function putPageInHistory(name) {
        debug(GenDebug, "pageHistory.isNotInHistory(name)",
pageHistory.isNotInHistory(name));
        if (pageHistory.isNotInHistory(name)) {
                        pageHistory.setPageFlag(name, "1");
        }
}
function dumpObject(obj) {
        var dump = "";
        for (var i in obj) dump += i + 37 =" + obj[i] + "\n";
        return dump;
}
/*=====================================================
========
``` getObject( )

Description: convert object name string or object reference into a valid object reference for both browsers: this is a reference on which you can set some style attributes

```
========================================================
======== */
function getObject(obj) {
    var theObj;
    if (typeof obj == "string") {
        var iniObj;
        if (isNav6) {
            iniObj = document.getElementById(obj);
        }
        else {
            iniObj = eval("document." + coll +obj);
        }
        if (IsUndef(iniObj)) {
            return "undefined";
        }
        if(isNav4) {
            return iniObj;
        }
        else {
        // in the IE or NS6 case the iniObj.style object may be undefined
            if (IsDef(iniObj.style)) {
                return iniObj.style;
            }
            else {
                return "undefined";
            }
        }
    }
    else {
        theObj = obj;
    }
    return theObj;
}
/*========================================================
========
``` getObjectRef( )

Description: convert object name string or object reference into a valid object reference for both browsers, without the style in IE: this is the real object reference this function is adapted from Danny Goodman's "Dynamic Html: The Definitive Reference"

http://www.amazon.com/exec/obidos/ASIN/1565924940/qid%3D963012863/00 2-0174003-8509633

```
========================================================
======== */
function getObjectRef(obj) {//alert("getRef "+obj);
    var theObj;
    if (typeof obj == "string") {
        var iniObj = eval("document." + coll + obj);
//alert("getRef"+iniObj);
        if (IsUndef(iniObj)) {
            return "undefined1";
        }
        return iniObj;
        else }
        theObj = obj;
    }
    return theObj;
}
/*========================================================
========
```

FUNCTION: IsUndef
INPUT: val—the value to be tested
RETURN: true, if the value is undefined false, otherwise.
PLATFORMS: Netscape Navigator 3.01 and higher,
 Microsoft Internet Explorer 3.02 and higher,
 Netscape Enterprise Server 3.0,
 Microsoft IIS/ASP 3.0.

```
========================================================
======== */
function IsUndef( val ) {
    var isValid = false;
    if (val+"" == "undefined")
        isValid = true;
    return is Valid;
} // end IsUndef
function IsDef( val ) {
    return !IsUndef(val);
} // end IsUndef
/**
* <pre>
* This function
*    checks if the form is allowed to be submitted.
*    if yes, it sets the action, then calls form.submit( )
*
* Usage:
*
* <code>
*    <a href="Javascript:submitForm('/iMM/somefile.jsp', 'myForm', 'someUniqueKey', true)">
* </code>
*
* </pre>
function submitForm(action, formName, key, confirmFlag) {
    //we put a provision here to let the users of this function not provide the
last argument, which the ndefaults to true
    if (IsUndef(confirmFlag)) {
        confirmFlag = true;
    }
    if (allowSubmit(key, confirmFlag)) {
        debug(GenDebug, "formName", formName);
        eval("document." + formName + ".action=\""+ action +"\"");
        eval("document." + formName + ".submit( )");
    }
}--
```

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

I claim:

1. A method for selectively disabling resubmission of an HTTP request comprising:

receiving input relating to a functional group having a unique key, wherein a functional group comprises two input controls identified by the unique key and wherein an activation flag is associated with the unique key;

determining whether one of the input controls of the functional group has been previously activated based on a setting of the activation flag; and when one of the input controls of the functional group has been previously activated, selectively disabling submission of a request based on the received input for the functional group.

2. The method of claim 1, further comprising:

when none of the input controls of the functional group has been previously activated, updating the activation flag associated with the unique key for the functional group to indicate that a member of the functional group has been previously activated and then submitting the request.

3. The method of claim 1, wherein the act of selectively disabling comprises:

determining a confirmation attribute value; and when the confirmation attribute has a first value, selectively displaying a first message indicating that a related response has been previously submitted and including a control to enable the resubmission of the HTTP request.

4. The method of claim 1, wherein the act of selectively disabling comprises:
   determining a confirmation attribute value; and
   when the confirmation attribute has a second value, selectively displaying a second message indicating that a related response has been previously submitted and including no control to enable the resubmission of the HTTP request.

5. The method of claim 4, wherein the act of selectively disabling further comprises:
   when the confirmation attribute has a first value, selectively displaying a first message indicating that a related response has been previously submitted and including a control to enable the resubmission of the request.

6. The method of claim 5, wherein the act of selectively disabling further comprises:
   determining an input value provided in response to the first message; and
   when the input value is affirmative, resubmitting the request.

7. A method for selectively disabling resubmission of an HTTP request comprising:
   receiving a first web page comprising a functional group associated with an identifier, wherein the functional group comprises a plurality of input controls as members, each of the input controls affecting submission of a request and being identified as the functional group members by the identifier, and wherein a flag is associated with the identifier, the flag having a value indicating activation of any of the members of the functional group;
   receiving input relating to one of the input controls of the functional group;
   submitting a response based on the received input relating to the member of the functional group;
   selectively disabling submission of a request based on the received input when the value of the flag indicates prior activation by disabling a submission capability for each of the members of the functional group.

8. The method of claim 7 further comprising:
   receiving a second web page in response to the submission of the first web page;
   receiving input relating to a back function;
   redisplaying the first web page on a network device; and
   rendering the first web page from a cache associated with the network device.

9. The method of claim 7 further comprising:
   receiving input relating to a member of the functional group;
   determining a confirmation attribute value;
   when the confirmation attribute has a first value, displaying a first message indicating that a related response has been previously submitted and including a control to enable the submission of the request; and
   when the confirmation attribute has a second value, displaying a second message indicating that a related response has been previously submitted and including no control to enable the submission of the request.

10. A network device for selectively disabling resubmission of an HTTP request comprising:
    a network communication interface configured to receive a web page comprising a plurality of input controls from a network, wherein at least two of the plurality of input controls are group members of a functional group;
    an input device configured to receive user input relating to resubmission of the HTTP request; and
    a processor configured to selectively disable resubmission of the HTTP request when a functional group member has been previously submitted, wherein the resubmission is selectively disabled by determining whether confirmation for the HTTP request is allowed and when determined allowed, resubmitting the request.

11. The system of claim 10, wherein the processor is additionally configured to selectively allow resubmission of the HTTP request when a functional group member has been previously submitted and an affirmative input is received from the input device.

12. The system of claim 11, wherein the processor is configured to cause an output device to display a first message indicating that a related response has been previously submitted and including a control to enable the resubmission of the HTTP request.

13. The system of claim 12, wherein the processor is additionally configured to cause an output device to display a second message indicating that a related response has been previously submitted and including no control to enable the resubmission of the HTTP request.

14. The system of claim 13, wherein the processor is configured to cause the first message to display when a confirmation attribute is set to a first value and the second message to display when the confirmation attribute is set to a second value.

15. A system for selectively disabling resubmission of an HTTP request comprising:
    a network communication interface configured to receive a web page comprising a plurality of input controls from a network, wherein at least two of the plurality of input controls are group members of a functional group;
    input device means configured to receive user input relating to resubmission of the HTTP request; and
    processor means configured to selectively disable resubmission of the HTTP request when a functional group member has been previously submitted, wherein the resubmission is selectively disabled by determining whether confirmation for the HTTP request is allowed and when determined allowed, resubmitting the request.

16. A computer program product, comprising a computer readable medium having computer code embodied therein for selectively disabling resubmission of an HTTP request comprising:
    computer readable program code devices configured as a network communication interface configured to receive a web page comprising a plurality of input controls from a network, wherein at least two of the plurality of input controls are group members of a functional group;
    computer readable program code devices configured to receive user input relating to resubmission of the HTTP request; and
    computer readable program code devices configured to selectively disable resubmission of the HTTP request when a functional group member has been previously submitted, wherein the resubmission is selectively disabled by determining whether confirmation for the HTTP request is allowed and when determined allowed, resubmitting the request.

* * * * *

UNITED STATES PATENT AND TRADEMARK OFFICE
CERTIFICATE OF CORRECTION

PATENT NO. : 6,898,619 B1
DATED : May 24, 2005
INVENTOR(S) : Tuan Tran

It is certified that error appears in the above-identified patent and that said Letters Patent is hereby corrected as shown below:

<u>Title page,</u>
Item [73], Assignee, "Sun Microsystmes, Inc." should be -- Sun Microsystems, Inc. --
.

Signed and Sealed this

Twenty-third Day of August, 2005

JON W. DUDAS
*Director of the United States Patent and Trademark Office*